US011936704B2

(12) United States Patent
Riviere et al.

(10) Patent No.: US 11,936,704 B2
(45) Date of Patent: Mar. 19, 2024

(54) METHOD TO BE IMPLEMENTED AT A DEVICE ABLE TO RUN ONE ADAPTIVE STREAMING SESSION, AND CORRESPONDING DEVICE

(71) Applicant: InterDigital Madison Patent Holdings, SAS, Paris (FR)

(72) Inventors: Marc Riviere, Papillon (FR); Stephane Gouache, Cesson-Sevigne (FR); Nicolas Le Scouarnec, Liffre (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/281,631

(22) PCT Filed: Sep. 30, 2019

(86) PCT No.: PCT/EP2019/076349
§ 371 (c)(1),
(2) Date: Mar. 31, 2021

(87) PCT Pub. No.: WO2020/070037
PCT Pub. Date: Apr. 9, 2020

(65) Prior Publication Data
US 2021/0392179 A1     Dec. 16, 2021

(30) Foreign Application Priority Data

Oct. 5, 2018  (EP) .................................... 18306313

(51) Int. Cl.
*H04L 29/06* (2006.01)
*H04L 12/26* (2006.01)
(Continued)

(52) U.S. Cl.
CPC ........ *H04L 65/613* (2022.05); *H04L 43/0864* (2013.01); *H04L 43/10* (2013.01); *H04L 65/80* (2013.01)

(58) Field of Classification Search
CPC . H04L 65/4092; H04L 43/0864; H04L 43/10; H04L 65/80
See application file for complete search history.

(56) References Cited

U.S. PATENT DOCUMENTS 9,473,406 B2   10/2016   Penner et al.
9,549,189 B2    1/2017   Matcha et al.
(Continued)

FOREIGN PATENT DOCUMENTS

CN   102843579 A   12/2012
CN   103888846 A    6/2014
(Continued)

OTHER PUBLICATIONS

"Building an Open Source DASH-AVC/264 Player", available at https://www.youtube.com/watch?v=med4nzDf9dw.
(Continued)

*Primary Examiner* — Kostas J Katsikis
(74) *Attorney, Agent, or Firm* — VOLPE KOENIG (57) ABSTRACT

During an adaptive streaming session of video content, an access latency is obtained by a client device (100A) running the adaptive streaming session in order to adapt the quality of the requested video content when necessary.

16 Claims, 3 Drawing Sheets

(51) Int. Cl.
*H04L 43/0864* (2022.01)
*H04L 43/10* (2022.01)
*H04L 65/613* (2022.01)
*H04L 65/80* (2022.01)

(56) References Cited

U.S. PATENT DOCUMENTS

| | | | | |
|---|---|---|---|---|
| 2007/0097852 A1* | 5/2007 | Thesling | ............ | H04B 7/18582 |
| | | | | 370/335 |
| 2007/0217448 A1* | 9/2007 | Luo | ............ | H04L 47/283 |
| | | | | 370/468 |
| 2008/0134258 A1* | 6/2008 | Goose | ............ | H04L 67/108 |
| | | | | 725/91 |
| 2008/0267069 A1* | 10/2008 | Thielman | ............ | H04N 7/15 |
| | | | | 348/E7.083 |
| 2012/0307885 A1 | 12/2012 | Agarwal et al. | | |
| 2013/0219073 A1 | 8/2013 | Dong et al. | | |
| 2013/0282918 A1 | 10/2013 | De Vleeschauwer et al. | | |
| 2013/0326024 A1 | 12/2013 | Chen et al. | | |
| 2015/0058448 A1 | 2/2015 | Proctor | | |
| 2015/0248462 A1 | 9/2015 | Theeten et al. | | |
| 2015/0334153 A1 | 11/2015 | Koster et al. | | |
| 2016/0191594 A1 | 6/2016 | Moustafa et al. | | |
| 2016/0205164 A1 | 7/2016 | Schmidt et al. | | |
| 2016/0261483 A1 | 9/2016 | Liik et al. | | |
| 2016/0366488 A1* | 12/2016 | Long | ............ | G11B 27/10 |
| 2017/0126527 A1 | 5/2017 | Ouedraogo et al. | | |
| 2017/0126765 A1 | 5/2017 | Taibi et al. | | |
| 2018/0191601 A1* | 7/2018 | Micallef | ............ | H04L 43/0858 |
| 2018/0278664 A1* | 9/2018 | Chen | ............ | H04L 47/2416 |
| 2018/0295144 A1* | 10/2018 | Jackson | ............ | H04L 43/10 |
| 2019/0141193 A1* | 5/2019 | Lee | ............ | H04L 65/1069 |
| 2020/0196036 A1* | 6/2020 | Eiselt | ............ | H04Q 11/0067 |
| 2021/0211490 A1* | 7/2021 | Zhang | ............ | H04L 67/101 |

FOREIGN PATENT DOCUMENTS

| | | | | |
|---|---|---|---|---|
| CN | 106412701 A | 2/2017 | | |
| EP | 3 113 442 | 1/2017 | | |
| GB | 2565766 A | 2/2019 | | |
| WO | 2009106015 A1 | 9/2009 | | |
| WO | 2011047335 A1 | 4/2011 | | |
| WO | 2011153475 A1 | 12/2011 | | |
| WO | 2012175448 A1 | 12/2012 | | |
| WO | 2013048484 A1 | 4/2013 | | |
| WO | 2014201068 A1 | 12/2014 | | |
| WO | WO-2017027714 A1 * | 2/2017 | ............ | H04L 41/12 |
| WO | 2017054935 A1 | 4/2017 | | |

OTHER PUBLICATIONS

DASH.js v1.5 diagrams, https://docs.google.com/drawings/d/16_EztksKjiZSF0HdjR44soAs7x8QewwlqnABnqjhyk4/edit, 1 page.

Jiang et al., "Improving Fairness, Efficiency, and Stability in HTTP-Based Adaptive Video Streaming with Festive," IEEE / ACM Transactions on Networking, vol. 22, No. 1, pp. 326-340 (Feb. 2014).

Kua et al., "A Survey of Rate Adaptation Techniques for Dynamic Adaptive Streaming over HTTP," IEEE Communications Surveys and Tutorials, vol. 19, No. 3, pp. 1842-1866 (2017).

Spiteri et al., "BOLA: Near-Optimal Bitrate Adaptation for Online Videos," arXiv:1601.06748v2 [cs.NI], 12 pages (Apr. 12, 2016).

Yin et al., "A Control-Theoretic Approach for Dynamic Adaptive Video Streaming over HTTP," Carnegie Mellon University, 14 pages (Aug. 17-21, 2015).

* cited by examiner

Figure 5 ure. Accordingly, it should be understood that these statements are to be read in this light, and not as admissions of prior art.

METHOD TO BE IMPLEMENTED AT A DEVICE ABLE TO RUN ONE ADAPTIVE STREAMING SESSION, AND CORRESPONDING DEVICE

This application is the U.S. National Stage, under 35 U.S.C. § 371, of International Application No. PCT/EP2019/076349 filed Sep. 30, 2019, which claims the benefit of European Application No. 18306313.0 filed Oct. 5, 2018, the contents of which are incorporated herein by reference.

TECHNICAL FIELD

The present disclosure generally relates to the management of adaptive streaming sessions operated at a device belonging to a network.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

HTTP adaptive technologies are pushed by various stakeholders to allow provision of over the top audiovisual delivery in the Internet. Such technologies allow a client device to receive video in the form of small successive segments (a few seconds long), so called chunk. Each segment is requested through the HTTP protocol and may exist in different variants (so called representations), allowing the client device to choose at any time an appropriate bit rate matching the network and device constraints.

Among the HTTP adaptive streaming (HAS) protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developed by 3GPP within the SA4 group. These HTTP adaptive streaming existing techniques vary in the manifest file format, said manifest providing meta-data to describe the content options (bit rate, image dimensions, frame rate . . . ), the organization of the available representations of the content in segments, in the codecs supported, and in the content protection technologies.

In particular, when a client device wants to play an audio/video content, it first has to get such a manifest describing how this specific content can be obtained. This is done through HTTP by getting some 'file' from an URL. This manifest file lists the available representations of the content (in terms of bit rate and other properties) and, for each representation, the URLs that allow loading the content segments for each time slice. For Video on Demand (VoD), the entire description of the A/V content is provided, while for live content (e.g. TV content), the description covers only a short period of time and needs to be reloaded periodically to discover the new items when time passes.

Depending on its capabilities and the knowledge it has from the networking environment, the client device selects one representation (e.g. based on its bit rate) and loads the first segment(s) of content. It buffers a few segments to be able to cope with network impediments. Then, the A/V content is played from each received segments one after the other. At the same time, the client device measures the reception rate and may decide to select a higher or a lower bit rate. In such case, it just requests the next segment(s) from another representation. Every HTTP streaming technique is such that it is possible for the client device to keep a continuous playing while going from a segment with a given bit rate to the next segment with another bit rate. This way when the competing traffic on the network introduces variations on the rate at which the A/V content is received, the client device is able to react and adapt by selecting segments with a bit rate that allows maintaining the buffer filling to a secure level. Indeed, the client device tries to reach the highest possible bit rate to provide a good viewing quality to end user, while staying at a level where the rendering will not suffer from late reception of data causing macro-blocks or picture freezes.

HTTP streaming techniques (in particular their associated rate adaptation algorithm) have then in common the fact that they dynamically adapt to varying network conditions by adjusting the amount data they transfer. However, they generally take decisions disregarding the fact that other applications may use the network.

The present disclosure has been devised with the foregoing in mind.

SUMMARY

According to one or more embodiments, there is provided a device configured to belong to a network comprising one or more devices, said device being able to run at least one ongoing adaptive streaming session relying on one current network connection for receiving segments of a multimedia content available at one or more qualities, said device comprising one or more processors configured for:

obtaining an access latency between the device and a network equipment by using an auxiliary connection distinct from the current connection, adapting the ongoing adaptive streaming session according to the obtained access latency.

According to one or more embodiments, there is provided a method to be implemented at a device configured to belong to a network comprising one or more devices, said device being able to run at least one ongoing adaptive streaming session relying on one current network connection for receiving segments of multimedia content available at one or more qualities, the method comprising:

obtaining an access latency the device and a network equipment by using an auxiliary connection distinct from the current connection, adapting the ongoing adaptive streaming session according to the obtained access latency.

According to one or more embodiments, there is provided a computer program product at least one of downloadable from a communication network and recorded on a non-transitory computer readable medium readable by at least one of computer and executable by a processor, comprising program code instructions for implementing a method to be implemented at a device configured to belong to a network comprising one or more devices, said device being able to run at least one ongoing adaptive streaming session relying on one current network connection for receiving segments of multimedia content available at one or more qualities, the method comprising:

obtaining an access latency the device and a network equipment by using an auxiliary connection distinct from the current connection, adapting the ongoing adaptive streaming session according to the obtained access latency.

According to one or more embodiments, there is provided a non-transitory program storage device, readable by a computer, tangibly embodying a program of instructions executable by the computer to perform a method to be implemented at a device configured to belong to a network comprising one or more devices, said device being able to run at least one ongoing adaptive streaming session relying on one current network connection for receiving segments of multimedia content available at one or more qualities, the method comprising:

obtaining an access latency the device and a network equipment by using an auxiliary connection distinct from the current connection, adapting the ongoing adaptive streaming session according to the obtained access latency.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned methods.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

Embodiments are depicted with regard to an adaptive streaming environment to deliver a video content to a client device through a delivery network.

Figure 1:
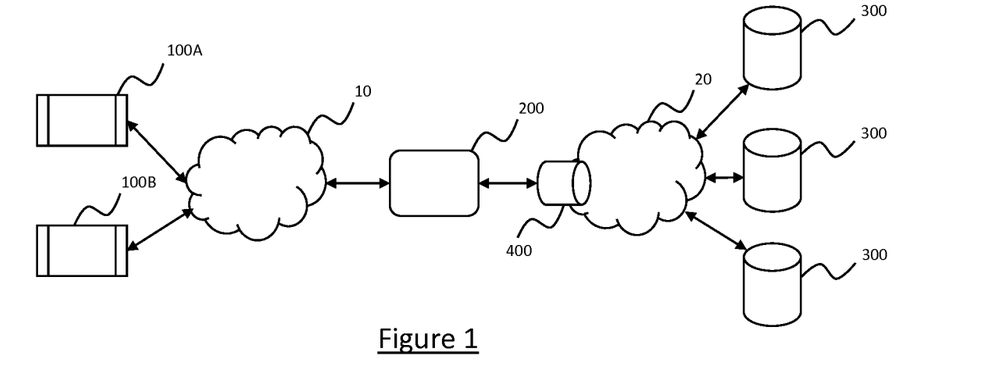
FIG. 1 is a schematic diagram of an exemplary Client-Server architecture wherein some embodiments might be implemented.

As shown in the exemplary embodiment of FIG. 1, a Client-Server network architecture, supported by a first network 10 (e.g. a home network, an enterprise network), comprises one or several client devices 100A, 100B (only two client devices are represented) in communication with a gateway 200 and a second network 20 (e.g. a broadband network such as the Internet) wherein one or more network equipment 300 (in FIG. 1, three servers are represented), such as content servers (e.g. implementing the HTTP protocol to deliver data). The first network 10 is for instance connected to the second network 20 thanks to an access network 400 in communication with the gateway 200.

Figure 2:
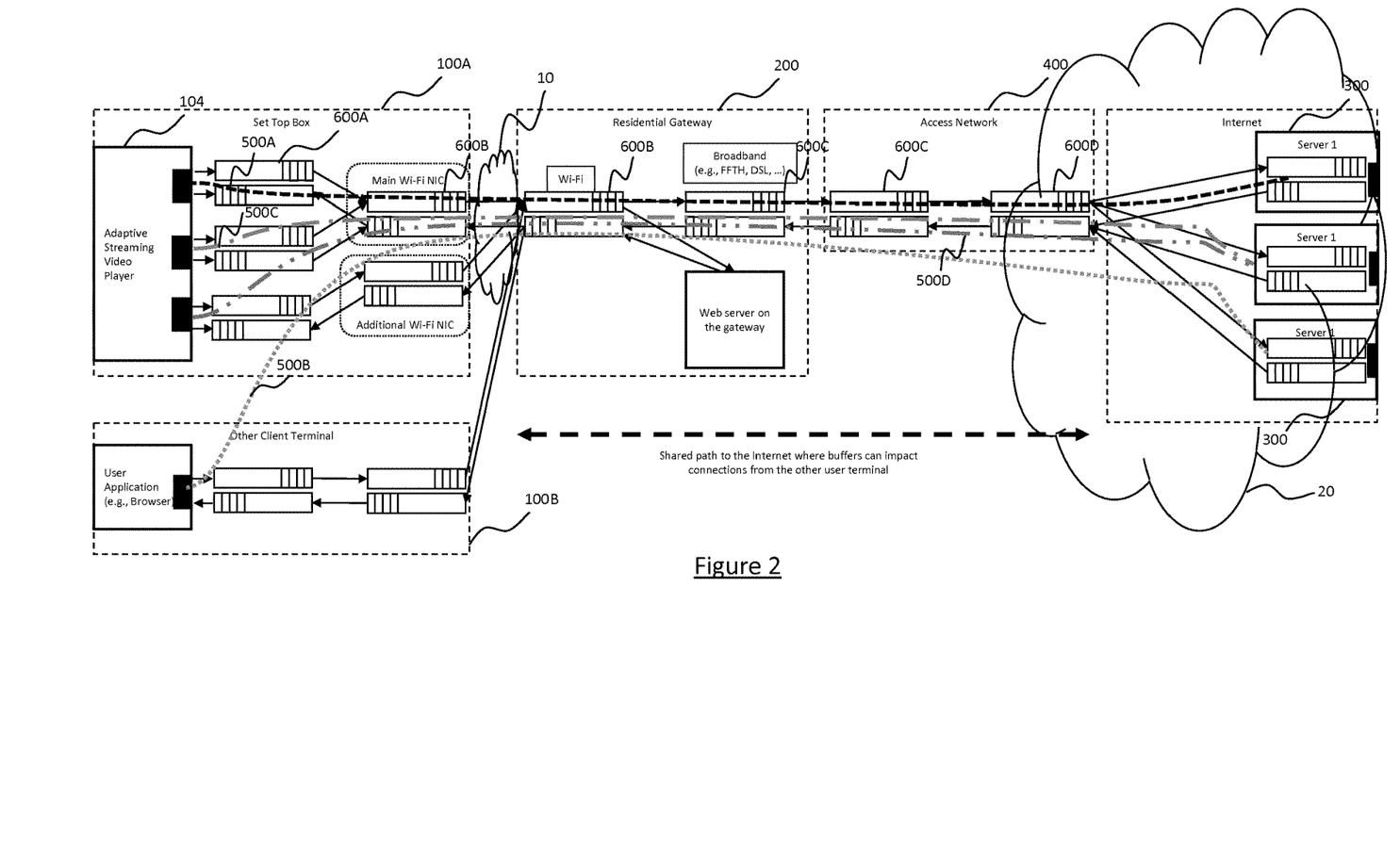
FIG. 2 is a detailed schematic diagram of the exemplary Client-Server architecture of FIG. 1 wherein some embodiments might be implemented.

The client device 100A (e.g. a set-top box as shown in FIG. 2)—which is an HTTP adaptive streaming (HAS) client device connected to the gateway 200 through the network 10 (as a home network or an enterprise network)—wishes to connect to a HTTP server 300 through the broadband network 20 in order to launch an adaptive streaming session. Once the connection is established with the client device 100A, the server 300 streams segments to the client device 100A, upon requests, using HAS protocol over, for instance, one or more TCP/IP connections.

Figure 3:
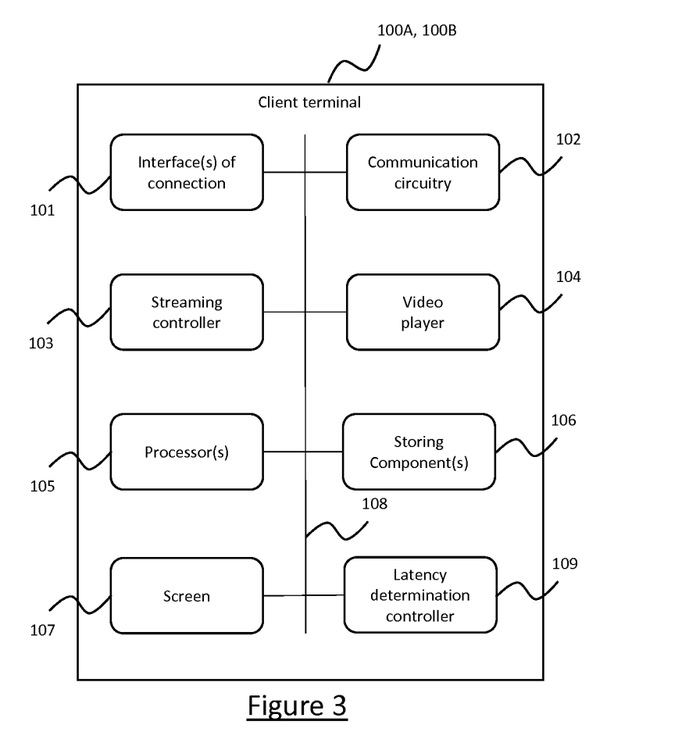
FIG. 3 is a block diagram of an exemplary client device of the Client-Server architecture of FIG. 1, wherein some embodiments might be implemented.

As shown in the example of FIG. 3, in one embodiment, a client device 100A, 100B of the first network 10 can comprise at least:
- interface(s) of connection 101 (wired and/or wireless, as for example Wi-Fi, Ethernet, etc.) to the network 10 or additional network (not shown in FIG. 1);
- a communication circuitry 102 containing the protocol stacks to communicate with one or more servers 300. In particular, the communication module 102 comprises the TCP/IP stack well known in the art. Of course, it could be any other type of network and/or communicating means enabling a client device 100A, 100B to communicate with a server 300;
- a streaming controller 103 which receives, along an adaptive streaming session, a multimedia content from one or more servers 300 (especially the corresponding segments). In particular, the streaming controller 103 can for instance continually select segments at the bit rate that better matches the network constraints and its own constraints;
- a video player 104 adapted to decode and render the multimedia content received through the adaptive streaming session. It should be understood that the streaming controller 103 and the video player 104 can be combined, in a variant, to form a single entity;
- one or more processor(s) 105 for executing the applications and programs stored in a memory of the client device 100;
- storing component(s) 106 (e.g. volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code). In particular, a volatile memory can for instance buffer segments received from a server 300 before their transmission to the video player 104;
- a screen 107. In a variant, the screen 107 can be a separate component in communication with the client device;
- an internal bus 108 (hardware and/or software implementation) to connect the various modules and all means well known to the skilled in the art for performing the generic client device functionalities,
- a latency determination controller 109 as described hereinafter.

As an example, the client device 100A, 100B is a portable media device, a mobile phone, a tablet or a laptop, a head mounted device, a TV set, a set-top box or the like. Naturally, the client device 100A, 100B might not comprise a complete video player, but only some sub-elements such as the ones for demultiplexing and decoding the media content and might rely upon an external means to display the decoded content to the end user. In this case, the client device 100A, 100B is a HTTP Adaptive Streaming capable video decoder, such as the set-top box as shown in the FIG. 2.

Besides, in an embodiment, the gateway 200 can be, for instance, a Digital Subscriber Line (DSL) gateway, providing an Internet broadband access to the local network 10 through the DSL technology. Of course, the gateway could be any type of broadband gateway such as cable, fiber or wireless.

Figure 4:
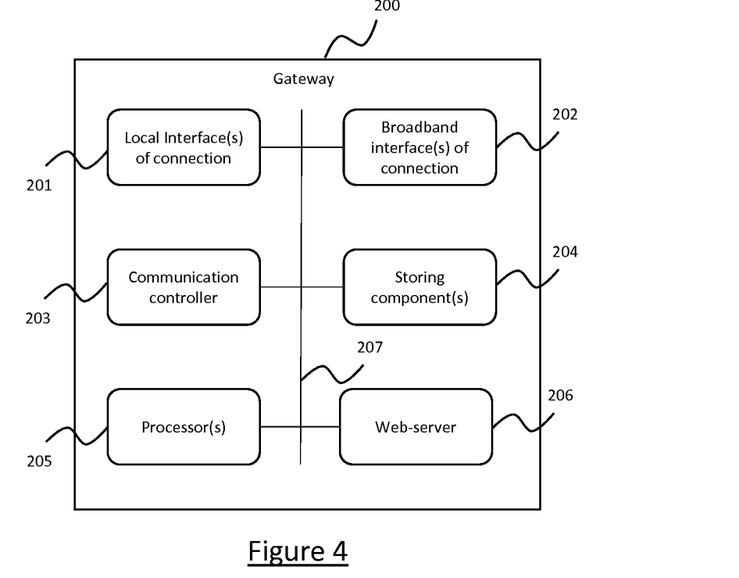
FIG. 4 is a block diagram of an exemplary gateway of the Client-Server architecture of FIG. 1, wherein some embodiments might be implemented.

As shown in FIG. 4, the gateway 200 can comprise:
- interface(s) of connection 201 (wired and/or wireless, as for example Wi-Fi, Ethernet, etc.) to the local network 10;
- broadband interface(s) of connection 202 (wired and/or wireless) to the broadband network 20 (via an access point 400); and
- a communication controller 203 comprising the protocol stacks to communicate through the interfaces of connections 201 and 202. In particular, the communication controller 203 comprises an Internet Protocol stack, noted IP stack;
- storing component(s) 204 (e.g. volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code). In particular, the storing component(s) 204 can for instance buffer the segments received from the server 300 before their transmission to the video player 104;
- one or more processor(s) 205 for executing the applications and programs stored in a non-volatile memory of the gateway 200;
- a web server 206 which can be used for configuration and management of the gateway (such as providing a configuration interface to the client device);
- an internal bus 207 to connect the various modules and processing means, routing and bridging means and all means well known to the skilled in the art for performing the generic residential gateway functionalities.

As shown in the embodiment of FIG. 2, the client device 100A is running an adaptive streaming session to retrieve a multimedia content from the Internet 20. To support the adaptive streaming session, a network connection 500A (e.g. a TCP connection) is established between the client device 100A and a remote server 300. Once the connection is established with the content server 300, the later can stream segments of the multimedia content to the client device 100A, upon client's request, using an adaptive streaming protocol (such as MPEG-DASH or HTTP Live Streaming (HLS)).

As illustrated in FIG. 2, packets exchanged along the network connection 500A encounter several buffers 600 along the communication path between the client device 100A and the server 300. For example, some buffers 600A are operated by the client device 100A. Some buffers 600B are implemented by the client device and by the gateway 200 to support their connection (such as the WiFi interface). Additional buffers are further operated by the gateway 200 (e.g. buffers 600C), the access network point 400 (e.g. buffers 600C, buffer 600D) and the server 300 (e.g. buffers 600D) to operate the network connection 500A supporting the adaptive streaming session.

Thus, when a web session is run by a web browser operated by a second client device 100B belonging to the local network 10, data packets exchanged during the web navigation over a distinct network connection 500B can encounter the same buffers as the ones used for the network connection 500A supporting an adaptive streaming session (i.e. such buffers are shared between applications). Since known streaming algorithms disregard other applications (such a web browser) that may use the network, they tend to consume as much bandwidth as possible, impacting negatively web navigation for instance. Packets belonging to web navigation can be queued in buffers, further buffering packets associated with the streaming session(s), so that the delivery time of packets for web navigation increases leading to a degradation of web browsing.

In one embodiment, for instance to avoid degradation of web browsing at second client device 100B, the client device 100A operating an adaptive streaming session (e.g. thanks to its streaming controller 103 and/or player 104) can implement a method 700 (shown in FIG. 5) for adapting the adaptive streaming session in order to reduce latency for parallel web browsing application(s).

Figure 5:
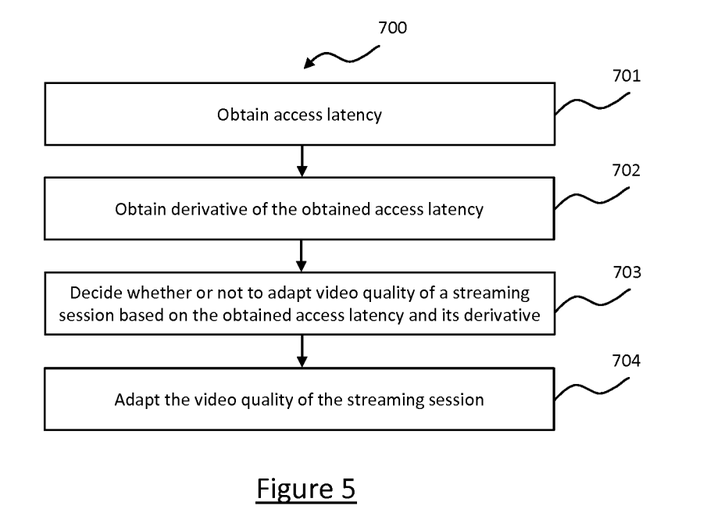
FIG. 5 is a flow chart of an exemplary method for operating an adaptive streaming player according to some embodiments.

According to the method 700, in a step 701, an access latency (different from segment-download latency or playback latency (commonly used to ensure that segments are delivered on-time for playback)) is obtained by the client device 100A (e.g. via the latency determination controller 109) through an auxiliary network communication 500C, 500D distinct from the network communication 500A supporting the adaptive streaming session. In an embodiment, the auxiliary connection can further be independent from the communication supporting adaptive streaming. Such an independent auxiliary connection can be established when the client device and the gateway comprise an additional WiFi network interface, independent from the one used to support the adaptive streaming session.

In an embodiment, the access latency monitored on the auxiliary connection can be defined as the Round Trip Time (RTT) between:
the controller 109 of the device 100A and a web-server 206 embedded in the gateway 200. In that case, the monitored access latency mainly corresponds to the latency deriving from the interfaces of communication between the client device 100A and the gateway 200 (e.g. the WiFi interface when wireless connection is used). It should be understood that the latency resulting from some buffers 600A operated by hardware components (not shown) of the client device 100A can be disregarded; or
the controller 109 and a server (not shown) arranged at the network access point 400 (e.g. at the BRAS (Broadband Remote Access Server) or BNG (Broadband Network Gateway)). In such case, the monitored access latency corresponds to the latency deriving from the interfaces of communication between the client device 100A and the gateway 200 and the latency resulting from the access network (such as applicative latency); or
the controller 109 arranged in the client device 100A and a first network equipment (such as a first router encountered along a communication path supporting the auxiliary connection) belonging to the ISP (Internet Service Provider) network, or to a reference server on the Internet 20, or to a CDN server, etc.

To obtain such an access latency, the latency determination controller 109 can send a message (such as a single data packet) and measure the time for receiving a corresponding response (i.e. the round-trip time). Different protocol can support such an implementation such as ICMP, TCP, UDP, HTTP, HTTP/2, etc.

It should be understood that the access latency considered in the present disclosure differs from a latency for delivering a segment in a streaming session corresponding to the time spent between the request for a segment and the delivery of this segment.

In an embodiment, different types of access latency (i.e. latency to the web-server of the gateway, latency to a server of the network access point, latency to a router/CDN server on Internet) can be obtained at the same time t to provide more accurate insights on the source of a potential congestion to the adaption algorithm operated by the client device 100A (e.g. at the streaming controller 103 and/or the player 104).

While the latency determination controller 109 has been described outside of the player 104 (as shown in FIG. 3), it can naturally be arranged, in another embodiment, within the player 104 and/or the streaming controller 103.

In a further optional step 702, the client device 100A (e.g. thanks to the controller 109, the streaming controller 103, the player 104 and/or processor(s) 105) can determine a derivative of the network latency in order to assess a trend of its evolution (such as stable, decreasing, increasing). In an illustrative but non-limitative example, an estimation of the derivative of the network latency at time t can be obtained by the following equation:

$$lat'(t) = \frac{lat(t+dt) - lat(t-dt)}{2dt}$$

wherein:
lat'(t) corresponds to the derivative of the access latency at the time t;
lat(t) is the access latency measured at the time t;
dt defines the time interval between two successive measures of the access latency.

From the obtained derivative of the access latency, the three following cases can be derived:
the derivative of the access latency exceeds a value+K (i.e. lat'(t)>K), so that the access latency tends to increase (i.e. increasing trend);
the derivative of the access latency is inferior to the value-K (i.e. lat'(t)<-K), so that the access latency tends to decrease (i.e. decreasing trend);
the access latency is stable when the derivative of the access latency is comprised between -K and +K (i.e. -K≤lat'(t)≤K).

For example, K can correspond to a changes tolerance threshold to prevent from overreacting to small changes of latency not related to the streaming session.

In one embodiment, in a step 703, the client device 100A (e.g. via its streaming controller 103, player 104 and/or processor(s) 105) can decide whether or not the video quality of the ongoing adaptive streaming session can be adapted (in a step 704) based on the obtained access latency. To that end, the obtained access latency can be compared to a latency threshold (e.g. 200 ms), so that:

when the obtained access latency exceeds the latency threshold, a quality penalty is applied to select the quality (representation) of the segment to be downloaded. For instance, the quality penalty can be defined as:
- a bandwidth value to be removed from a bandwidth used to determine the highest quality to be requested (e.g. obtained by applying a function such as ABRQuality(bandwidthBudget) when implementing the MPEG-DASH standard);
- a number of qualities which cannot be selected from an ordered list of selectable qualities by considering first the highest qualities of the list. As an illustrative example, when the ordered list of selectable qualities comprises 8 kbps, 4 kbps, 2 kbps, 1 kbps and when the quality penalty is equal to 1, the quality 8 kbps cannot be selected anymore. When the quality penalty is equal to 2, the qualities 8 kbps and 4 kbps are not selectable anymore;

when the access latency is at most equal to the latency threshold, no quality penalty is applied.

In another embodiment, the client device 100A can decide whether or not the video quality of the ongoing adaptive streaming session can be adapted (in a step 704) based on the obtained access latency and its derivative, as follows:

when the access latency is high (e.g. exceeds a first time threshold such as 400 ms) and stable, the quality penalty applied to select the quality of the segment to be downloaded should be increased. For instance, the new quality L can be defined as follows:

$$L(t_{select})=L'(t_{select})-A(t_{select})$$

wherein:
L'($t_{select}$) is the highest quality for the given bandwidth budget (e.g. obtained by applying a function such as ABRQuality(bandwidthBudget) when implementing the MPEG-DASH standard) for the segment to be downloaded,
A($t_{select}$) is the quality penalty applied for selecting at time $t_{select}$ the new quality of the segment to be downloaded. In an illustrative but non-limitative example, A($t_{select}$)=A($t_{select}$-1)+dA1, wherein A($t_{select}$-1) is the quality penalty applied for selecting the quality of the previously downloaded segment and dA1 is a first variation of the quality penalty;

when the access latency is high and decreasing, the current quality of the streamed content can be maintained (i.e. the applied quality penalty is the same as for the selection of the quality of the previously downloaded segment, A($t_{select}$)=A($t_{select}$-1));

when the access latency is low (i.e. is lower than a second time threshold, such as 200 ms, the first and second time thresholds can be equal or different) and stable or decreasing, the current quality of the streamed content can be maintained or increased. For instance, the new quality L can be defined by:

$$L(t_{select})=L'(t_{select})-A(t_{select})$$

with A($t_{select}$)=A($t_{select}$-1)-dA2 wherein dA2 being a second variation of the quality penalty which can be equal, superior or inferior to dA1;

when the access latency is low and increasing, the current quality of the streamed content can be decreased. For instance, the quality penalty applied to select the quality of the segment to be downloaded should be slightly increased. For instance, the new quality L can be defined by:

$$L(t_{select})=L'(t_{select})-A(t_{select})$$

with A($t_{select}$)=A($t_{select}$-1)+dA3 wherein dA3<dA1, dA3 being a third variation of the quality penalty.

In further aspect, the latency threshold, the first time threshold and second time threshold can be determined from the impact the latency may have on user's experience. As a variant, these thresholds can be determined based on information from the gateway regarding the application(s) run on the device(s) (e.g. the thresholds tend to be lower for gaming applications than for web applications). In that case, thresholds are dynamically adapted according to information received from the gateway, so as to improve, for instance, video quality of the streaming session when a web application is implemented on a further device in comparison with video quality of the streaming session when a gaming application is operated.

Step 703 can be implemented by considering either the current access latency (i.e. the access latency at a time t), or the current access latency with an history of the access latency (e.g. corresponding to the values of the access latency obtained from the beginning of the streaming session, or to the values of the access latency obtained for a previous time interval).

Then, in the step 704, when the quality restriction is required by step 703, the client device will adapt the quality of the video streaming session when requesting the next segment(s) of the multimedia content (i.e. one or more qualities (i.e. representations) available at the content server 300) could not be chosen anymore by the client device 100A).

In an additional aspect, to further stabilize the video quality of the adaptive streaming session in order to avoid quality oscillation, the next increase/decrease in quality resulting from the implementation of steps 703 and 704 (especially when the obtained access latency is high and stable, or low and increasing, or low and stable/decreasing) may optionally be forced to occur only after a timeout (e.g. 10 seconds). For example, when the access latency is low and stable/decreasing, then the client device 100A can be allowed to increase the video quality of the streaming session after the timeout.

In a further aspect or complement, the method 700 can further comprise an optional step (which can be implemented within the adaptation step 704) wherein the client device 100A can assess the effect of a quality increase during the adaptive streaming session resulting from the implementation of the method 700. To that end, the current access latency is compared with past access latency(ies) (e.g. the previous obtained access latency). When the current access latency exceeds the past access latency from a given value (e.g. which depends on the considered past access latency(ies)), the quality increase determined at step 703 is not allowed to prevent from impacting negatively the access latency.

In a further embodiment, to avoid access latency from becoming high again, video qualities leading to access latency increases (e.g. observed one or several times) can be blacklisted permanently or for a predetermined time period (e.g. 30 or 60 seconds).

Thus, according to the described embodiments, the quality of the content provided at the client device 100A via the adaptive streaming session can be penalized when the latency is high and stable to allow buffers to drain, so that subsequent connections, HTTP requests, etc. can benefit from the low buffer-level (e.g. the response is received quickly). For instance, web navigation by another client device 100B of the local network 10 can be less impacted by long running download flows from an adaptive video streaming session running on another device 100A of the local network 10. Long page load time, unresponsive pages due to partially loaded resources can be avoided. Thanks to the implementation of the described method 700, the link quality for future short network connections (such as web browsing) can be preserved. In addition, because buffering is reduced, adaptive streaming players can react faster to changing conditions, impacting the video quality positively.

More generally, in an embodiment, adapting the ongoing adaptive streaming session comprises selecting a new quality for one or more next segments of the multimedia content depending on the obtained access latency.

In an embodiment, adapting the ongoing adaptive streaming session comprises selecting a new quality for one or more next segments of the multimedia content depending on the obtained access latency along with an history of the access latency.

In an embodiment, adapting the ongoing adaptive streaming session comprises comparing the obtained latency to a default value.

In an embodiment, obtaining the access latency relies on sending at least one data packet towards the network equipment to measure a Round Trip Time.

In an embodiment, a trend for the access latency is further obtained.

In an embodiment, the trend of the access latency is obtained from a derivative of the access latency.

In an embodiment, a quality leading to an increase of the access latency is blacklisted up to the end of the adaptive streaming session or for a given period of time.

In an embodiment, adapting the ongoing adaptive streaming session is implemented after a timeout.

In an embodiment, the auxiliary connection is independent from the current network connection.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

Besides, it is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

The invention claimed is:

1. A device configured to run at least one adaptive streaming session, the device comprising one or more processors configured to:

obtain access latency information regarding an access latency between the device and a network access equipment by using an auxiliary connection, wherein said auxiliary connection is distinct from a current network connection being used for receiving segments of a multimedia content available at one or more qualities; and adapt the adaptive streaming session running at the device according to the obtained access latency information by:

decreasing the quality for one or more next segments of the multimedia content in the case where the access latency is greater than a first value and is stable over time;

maintaining the quality for one or more next segments of the multimedia content in the case where the access latency is greater than the first value and is decreasing over time;

maintaining or increasing for one or more next segments of the multimedia content the quality in the case where access latency is smaller than a second value and stable or decreasing over time; and decreasing the quality for one or more next segments of the multimedia content in the case where the access latency is smaller than the second value and is increasing over time.

2. The device of claim 1, wherein a video quality associated with a high access latency is blacklisted.

3. The device of claim 1, wherein a video quality leading to an increase of the access latency is blacklisted for a given period of time.

4. The device of claim 1, wherein said network access equipment is one of a gateway, a network access point or a first network equipment encountered along a communication path supporting the auxiliary connection.

5. The device of claim 1, wherein obtaining the access latency information relies on sending at least one data packet on said auxiliary connection towards the network access equipment to measure a Round Trip Time round trip time.

6. The device of claim 1, wherein the access latency information is determined to be stable in the case where a derivative of the access latency information is comprised between a third value and a fourth value, said fourth value being larger than said third value.

7. The device of claim 6, wherein the access latency information is determined to be increasing in the case where a derivative of the access latency information exceed the fourth value.

8. The device of claim 6, wherein the access latency information is determined to be decreasing in the case where a derivative of the access latency information is below the third value.

9. A method for use in a device configured for running at least one adaptive streaming session, the method comprising:

obtaining access latency information regarding an access latency between the device and a network access equipment by using an auxiliary connection, wherein said auxiliary connection is distinct from a current network connection being used for receiving segments of a multimedia content available at one or more qualities; and adapting the adaptive streaming session running at said device according to the obtained access latency information by:

decreasing the quality in the case where the access latency is greater than a first value and is stable over time;

maintaining the quality in the case where the access latency is greater than the first value and is decreasing over time;

maintaining or increasing the quality in the case where access latency is smaller than a second value and stable or decreasing over time; and decreasing the quality in the case where the access latency is smaller than the second value and is increasing over time.

10. The method of claim 9, wherein a video quality associated with a high access latency is blacklisted.

11. The method of claim 9, wherein a video quality leading to an increase of the access latency is blacklisted for a given period of time.

12. The method of claim 9, wherein said network access equipment is one of a gateway, a network access point or a first network equipment encountered along a communication path supporting the auxiliary connection.

13. The method of claim 9, wherein obtaining the access latency information relies on sending at least one data packet on said auxiliary connection towards the network access equipment to measure a Round Trip Time round trip time.

14. The method of claim 9, wherein the access latency information is determined to be stable in the ca se where a derivative of the access latency information is comprised between a third value and a fourth value, said fourth value being larger than said third value.

15. The method of claim 14, wherein the access latency information is determined to be increasing in the case where a derivative of the access latency information exceed the fourth value.

16. The method of claim 14, wherein the access latency information is determined to be decreasing in the case where a derivative of the access latency information is below the third value.

* * * * *